US012634123B2

(12) United States Patent
Chau

(10) Patent No.: US 12,634,123 B2
(45) Date of Patent: May 19, 2026

(54) RANDOM TRIGGER FOR AUTOMATIC KEY ROTATION

(71) Applicant: Google LLC, Mountain View, CA (US)

(72) Inventor: Jimmy C. Chau, New York, NY (US)

(73) Assignee: Google LLC, Mountain View, CA (US)

( * ) Notice: Subject to any disclaimer, the term of this patent is extended or adjusted under 35 U.S.C. 154(b) by 488 days.

(21) Appl. No.: 17/939,486

(22) Filed: Sep. 7, 2022

(65) Prior Publication Data

US 2024/0080186 A1 Mar. 7, 2024

(51) Int. Cl.
*H04L 9/08* (2006.01)
*G06N 7/01* (2023.01)

(52) U.S. Cl.
CPC .............. *H04L 9/0861* (2013.01); *G06N 7/01* (2023.01); *H04L 9/0869* (2013.01)

(58) Field of Classification Search
CPC ....... G06N 7/01; H04L 9/0861; H04L 9/0869; H04L 9/0891
See application file for complete search history.

(56) References Cited

U.S. PATENT DOCUMENTS

| | | | | |
|---|---|---|---|---|
| 7,647,329 B1 * | 1/2010 | Fischman | ............... | G06F 3/067 |
| | | | | 707/999.1 |
| 7,921,450 B1 * | 4/2011 | Vainstein | ............ | G06F 21/6209 |
| | | | | 726/1 |

| | | | | |
|---|---|---|---|---|
| 8,006,280 B1 * | 8/2011 | Hildebrand | ........... | H04L 9/0825 |
| | | | | 380/278 |
| 9,300,464 B1 * | 3/2016 | Roth | ..................... | H04L 9/0891 |
| 9,906,360 B2 * | 2/2018 | Johnson | ................ | H04L 9/0631 |
| 10,678,697 B1 * | 6/2020 | Iyer | ..................... | H04L 67/5682 |
| 2003/0039357 A1 * | 2/2003 | Alten | ................... | H04L 9/0656 |
| | | | | 380/46 |
| 2004/0086117 A1 * | 5/2004 | Petersen | ............... | H04L 9/0668 |
| | | | | 380/44 |
| 2004/0205095 A1 * | 10/2004 | Gressel | .................... | H03K 3/84 |
| | | | | 708/253 |
| 2006/0020796 A1 * | 1/2006 | Aura | ..................... | H04L 9/3236 |
| | | | | 713/168 |
| 2007/0156842 A1 * | 7/2007 | Vermeulen | .......... | H04L 67/1097 |
| | | | | 709/217 |

(Continued)

OTHER PUBLICATIONS

International Search Report and Written Opinion for International Application No. PCT/US2023/024398 dated Sep. 7, 2023. 13 pages.

(Continued)

*Primary Examiner* — Greg C Bengzon
(74) *Attorney, Agent, or Firm* — Lerner David LLP

(57) ABSTRACT

The present disclosure provides for using a random trigger probability for determining whether to rotate cryptographic keys. The random trigger probability may be applied for each cryptographic operation that might yield a nonce collision. For example, the random trigger probability may be pre-computed, and each time a request to perform a cryptographic operation is received a random event with the trigger probability may be executed. Based on the random trigger probability, it is determined whether to rotate keys. The random trigger may be a function of a threshold for acceptable probability of failure, and parameters for a type of cryptographic operation and key.

18 Claims, 7 Drawing Sheets

(56) References Cited

U.S. PATENT DOCUMENTS

| | | | | |
|---|---|---|---|---|
| 2009/0177894 | A1* | 7/2009 | Orsini | H04L 9/0822 |
| | | | | 713/193 |
| 2010/0111296 | A1* | 5/2010 | Brown | H04L 9/3066 |
| | | | | 380/28 |
| 2011/0246741 | A1* | 10/2011 | Raymond | G06F 16/137 |
| | | | | 711/170 |
| 2012/0042098 | A1* | 2/2012 | Kasslin | H04L 9/3236 |
| | | | | 709/245 |
| 2012/0136635 | A1* | 5/2012 | Hung | G06F 7/582 |
| | | | | 703/2 |
| 2012/0198241 | A1* | 8/2012 | O'Hare | G06F 21/602 |
| | | | | 713/189 |
| 2013/0262421 | A1* | 10/2013 | Ferguson | H04L 9/0643 |
| | | | | 707/697 |
| 2014/0177829 | A1 | 6/2014 | MacMillan et al. | |
| 2015/0163056 | A1* | 6/2015 | Nix | H04B 1/3816 |
| 2015/0288524 | A1 | 10/2015 | Jaffe | |
| 2015/0381578 | A1* | 12/2015 | Thota | G06F 21/602 |
| | | | | 713/168 |
| 2016/0085955 | A1* | 3/2016 | Lerner | H04L 9/0869 |
| | | | | 726/20 |
| 2017/0205863 | A1* | 7/2017 | Lee | G06F 1/3206 |
| 2017/0286698 | A1* | 10/2017 | Shetty | H04L 67/10 |
| 2017/0353302 | A1* | 12/2017 | Fernandez | H04L 9/14 |
| 2018/0060596 | A1* | 3/2018 | Hamel | H04L 9/088 |
| 2018/0176011 | A1* | 6/2018 | Hars | H04L 9/0861 |
| 2018/0375838 | A1* | 12/2018 | Hersans | G06F 21/6218 |
| 2019/0007207 | A1 | 1/2019 | Roth | |
| 2019/0042734 | A1* | 2/2019 | Kounavis | G06F 21/54 |
| 2019/0104121 | A1* | 4/2019 | Khandani | H04L 9/0891 |
| 2019/0363877 | A1* | 11/2019 | Figueira | H04L 9/0869 |
| 2020/0082110 | A1 | 3/2020 | Roth et al. | |
| 2020/0153627 | A1* | 5/2020 | Wentz | H04L 9/50 |
| 2020/0334095 | A1* | 10/2020 | Xu | G06F 11/0709 |
| 2021/0351924 | A1* | 11/2021 | Luykx | H04L 9/088 |
| 2024/0073009 | A1* | 2/2024 | Keith, Jr. | H04L 9/3026 |

OTHER PUBLICATIONS

Moreau. Probabilistic Encryption Key Exchange. Electronics Letters, The Institution of Engineering and Technology, GB, vol. 31, No. 25, Dec. 7, 1995 (Dec. 7, 1995), pp. 2166-2168.

* cited by examiner

500

Determine collision probability model — 510

Determine trigger probability based on collision probability model, such that resulting collision probability does not exceed acceptable failure probability — 520

Receive encryption request — 530

Determine whether to rotate keys based on trigger probability — 540

RANDOM TRIGGER FOR AUTOMATIC KEY ROTATION

FIELD

The present disclosure generally relates to information security, including cryptography.

BACKGROUND

Cryptographic keys often have a limit on how many times they can be safely reused. Beyond such limits, reusing the key becomes unacceptably risky. To keep the risk at acceptable levels, cryptographic keys can be "rotated" such that they are replaced with new keys before they are used too many times. Commonly used methods to decide when to rotate keys can include rotating only after suspecting a compromise, rotating after a key is used a predetermined number of times, and rotating periodically according to a time-based schedule.

Rotating only after suspecting a compromise relies on the alertness of parties responsible for rotating the keys. For example, such parties would need to promptly detect compromise and act quickly to rotate keys. A likelihood of the parties missing when a key is used too many times, or when the security of a key is compromised, is unacceptably high.

Rotating after the key is used a certain number of times would effectively prevent a key from being used too many times, but it can be difficult to count how many times the key is used in distributed systems, wherein the same key could be used concurrently in multiple places.

Rotating keys periodically using a time-based schedule has potential for rotating keys too frequently or not rotating the keys frequently enough, and an inability to adapt to actual key usage. Rotating keys too frequently results in maintaining more keys than needed, leading to increased costs, and in some cases, decreased performance. When keys are not rotated frequently enough, the risk of using a key too many times or of repeating a nonce for the same key becomes unacceptably high. Furthermore, an entity responsible for configuring the rotation schedule might not have visibility into how often the relevant cryptographic keys are being used, and thus might not have a good way to determine the optimal rotation frequency. A time-based rotation schedule also does not adapt to changing usage patterns. For example, if a key starts to get used more frequently, the rotation schedule nevertheless remains the same.

BRIEF SUMMARY

One aspect of the disclosure provides a method of determining whether to rotate cryptographic keys, comprising determining a model of a collision probability that a first key to be used for a cryptographic operation will result in a collision, determining a random trigger probability based on the model of the collision probability, and automatically determining, with the one or more processors in response to receipt of a request to perform a cryptographic operation, based on the random trigger probability, whether to replace the first key with a second key. The random trigger probability may limit the collision probability to an accepted failure probability. The random trigger probability may be based on parameters for a type of the cryptographic operation. Such parameters may include a number of bits in a nonce.

In some examples, the second key may include one of a plurality of stored keys, and the method may include replacing the first key with the second key and maintaining the first key as an inactive key. In other examples, the second key may include a new key generated in response to a determination to replace the first key.

In some examples, the request may be received at a first computing device in a distributed system comprising a plurality of computing devices, wherein each computing device in the distributed system stores the first key in a respective cache, wherein each computing device updates its respective cache with the second key when the first computing device determines to replace the first key with the second key. One or more of the computing devices may update its respective cache asynchronously with the first computing device.

Determining whether to replace the first key with the second key may include executing an event where a given outcome occurs with the random trigger probability, and determining to replace the first key with the second key when the given outcome occurs. The event may include, for example, generating a random bit-string or generating a random floating point number.

Another aspect of the disclosure provides a system for determining whether to rotate cryptographic keys, comprising memory, and one or more processors in communication with the memory, the one or more processors configured to determine a model of a collision probability that a first key to be used for a cryptographic operation will result in a collision, determine a trigger probability based on the model of the collision probability, and automatically determine, in response to receipt of a cryptographic request, based on the trigger probability, whether to replace the first key with a second key. The trigger probability may limit the collision probability to an accepted failure probability. The random trigger probability may be based on parameters for a type of the cryptographic operation, such as a number of bits in a nonce.

The second key may include, for example, one of a plurality of keys stored in the memory. In other examples, the second key may be a new key generated in response to a determination to replace the first key.

In some examples, the system may include a distributed system comprising a plurality of computing devices, wherein each computing device in the distributed system stores the first key in a respective cache, wherein when the request is received at a first computing device in the distributed system and the first computing device determines to replace the first key with the second key, each computing device updates its respective cache with the second key. One or more of the computing devices may update its respective cache asynchronously with the first computing device.

In determining whether to replace the first key with the second key, the one or more processors may be configured to execute an event where a given outcome occurs with the random trigger probability, and determine to replace the first key with the second key when the given outcome occurs.

Yet another aspect of the disclosure provides a non-transitory computer-readable medium storing instructions executable by one or more processors for performing method of determining whether to rotate cryptographic keys, the method comprising determining a model of the collision probability that a first key to be used for a cryptographic operation will result in a collision, determining a trigger probability based on the model of the collision probability, and automatically determining, in response to receipt of a cryptographic request, based on the trigger probability, whether to replace the first key with a second key.

DETAILED DESCRIPTION

The present disclosure provides for using a random trigger probability for determining whether to rotate cryptographic keys. The random trigger probability may be applied for each cryptographic operation that might yield a nonce collision. For example, the random trigger probability may be initially computed, and then each time a request to perform a cryptographic operation is received, it is determined whether to rotate keys based on the random trigger probability. The random trigger probability may be a function of a threshold for acceptable probability of failure, and parameters for a type of cryptographic operation and key.

By using the random trigger probability, a rotation frequency of the cryptographic keys may automatically adapt to how often each key is being used. For example, more frequently used keys would be rotated more frequently, while less frequently used keys would be rotated less frequently. The random trigger probability therefore eliminates a need to count how many times each key has been used, which results in computational efficiencies and reduced memory consumption that would otherwise be used to keep such a count. Moreover, using the computed random trigger probability provides for increased security, as it ensures that the key would be rotated before reusing a nonce with the same key.

Figure 1:
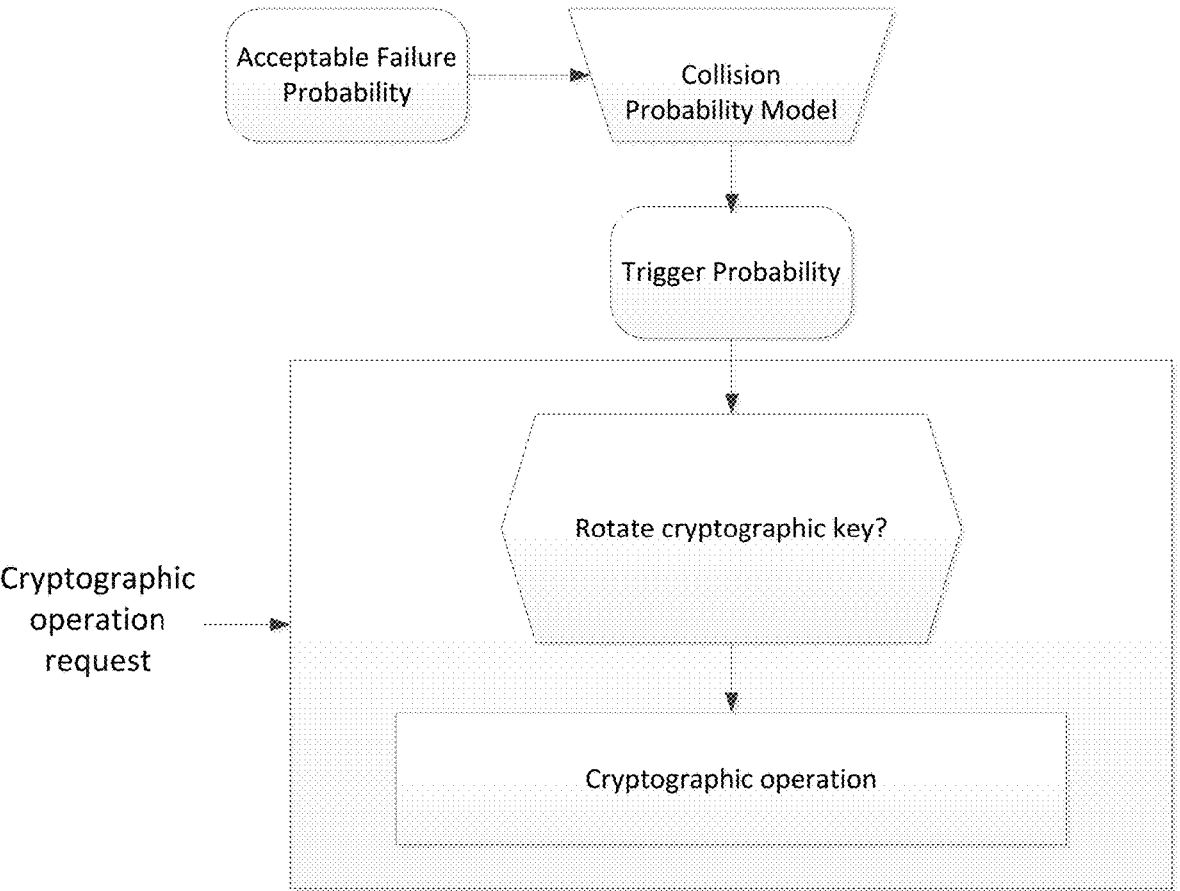
FIG. 1 is a schematic diagram of an example determination whether to rotate cryptographic keys according to aspects of the disclosure.

FIG. 1 is a schematic diagram of an example determination whether to rotate cryptographic keys. A cryptographic operation request is received, such as at a computing device or software module to perform the cryptographic operation. In response to receiving the request, the device or module determines whether to rotate the cryptographic key used for the cryptographic operation. Such determination is based on a random trigger probability, which is based on a collision probability model and an acceptable failure probability. In particular, the random trigger probability limits the collision probability to the acceptable failure probability.

The cryptographic operation request can be any type of call, signal, message, or other communication to the device or module performing the cryptographic operation. For example, the request can be a remote procedure call or the like. In some examples the request can include a key, such as a public key or private key. The request can be to perform encryption, signing, message authentication, or any of a variety of other cryptographic operations.

The cryptographic operation can be any of numerous types of cryptographic operations. For example, the operation can be symmetric, asymmetric, hybrid, etc. The operation can be for the purposes of encryption, signing, message authentication, etc. The operation can employ any of a variety of algorithms, such as data encryption standard (DES), 3DES, advanced encryption system (AES), RSA, elliptic curve cryptography (ECC), or others. The operation may adhere to one or more cryptography standards.

Figure 2:
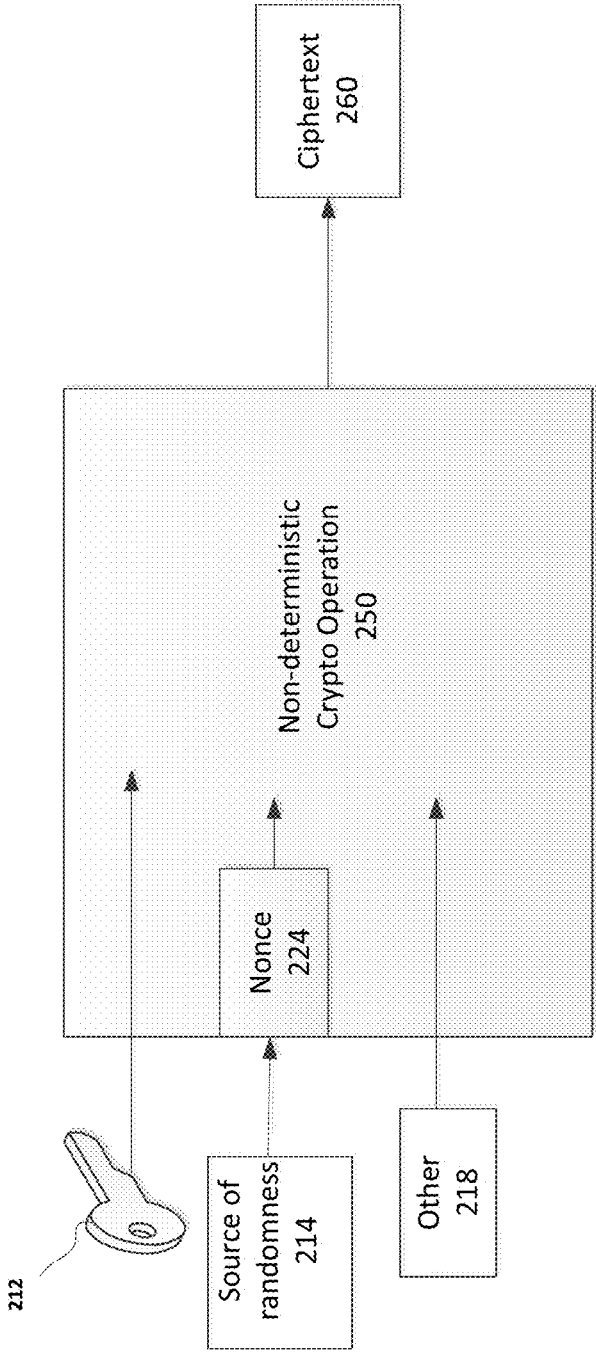
FIG. 2 is a schematic diagram illustrating an example cryptographic operation according to aspects of the disclosure.

As shown in FIG. 2, the cryptographic operation may be a non-deterministic operation 250 that utilizes as inputs a key 212, a source of randomness 214, and other information 218, such as plaintext to be encrypted, additional authenticated data, etc. The result of the operation 250 may be, for example ciphertext 260. The source of randomness may be any mechanism that generates something random, such as a number, letter, value, vector, etc. For example, the source of randomness 214 may be a random number generator or a pseudo-random number generator. The output from the source of randomness 214 may be used to generate a nonce 224. The nonce 224 may be, for example, an intermediate value to be used along with the key 212 in the cryptographic operation 250. The nonce 224 can be a very large number, such as having 10, 50, 100, or more digits. The more times the key 212 is used, the greater the probability that the nonce 224 will be generated to be a number that was previously used with the key 212. If the same value for the nonce 224 and the same key 212 are used together more than once, the cryptography can be considered broken as it may no longer provide intended security properties. Accordingly, the system and method described herein provides for rotating the key 212 based on a model of the probabilities of the nonce 224 being used more than once, without requiring counting of the number of times nonces 224 were generated.

Returning to FIG. 1, the collision probability is a probability of a nonce collision, wherein the same nonce is used more than once with the same key. The collision probability model may be represented by the following equation:

$$Pr[\text{collision}] =$$

$$\sum_{k=2}^{\infty} Pr[\text{no rotation in } k \text{ trials}] * Pr[\text{collision with } k \text{ } n-\text{bit nonces}] =$$

$$\sum_{k=2}^{\infty} (1-t)^k \left( 1 - \prod_{i=1}^{k-1} \frac{2^n - i}{2^n} \right)$$

where Pr[collision] is the resulting collision probability, t is the random trigger probability, and n is the number of bits in each uniformly-distributed random nonce. The probability of no rotation in k trials may be $(1-t)^k$.

A suitable random trigger probability can be determined as a function of a threshold probability of failure, and parameters of the type of cryptographic operation. Such parameters can include, for example, a number of bits or digits in the nonce. For example, the optimal random trigger probability can be determined as t in the collision probability equation above when that the collision probability equals the acceptable failure probability.

Alternatively, a safe random trigger probability can be determined by solving for a t in the probability equation above, so that the resulting collision probability is less than or equal to the acceptable failure probability; any t that yields a collision probability less than or equal to the acceptable failure probability would be a safe random trigger probability. According to some examples, a safe random trigger probability can be determined using the following upper bound on the collision probability:

$Pr[\text{collision}]=Pr[\text{collision within } k \text{ trials}]+Pr[\text{collision only after more than } k \text{ trials}]\leq Pr[\text{collision with } k \text{ } n\text{-bit nonces}]+Pr[\text{no rotation in } k \text{ trials}]$ A more-optimal t can be determined using a more granular equation with multiple boundaries. For example, rather than using a single k, $\{k_1, k_2, \ldots, k_j, \ldots k_m\}$ can be used with the following equation:

$$Pr[\text{collision}] = Pr[\text{collision within } k_1 \text{ trials}] +$$

$$\sum_{j=1}^{m-1} Pr[\text{first collision in trials } k_j + 1 \text{ to } k_{j+1}] +$$

$$Pr[\text{collision only after more than } k_m \text{ trials}]$$

The acceptable probability of failure may be practically dictated by a level of desired confidence that the cryptography is not broken. For example, the acceptable probability of failure may be supplied by a customer or software designer. In some examples, the acceptable probability of failure may be established by policy or by relevant standards.

The determination of whether to rotate the key can be made each time a request is received. The determination can be made before, during, or after the cryptographic operation. Similarly, the rotation of keys could be performed before the cryptographic operation requested, or after, such as before a next cryptographic operation, within a next x number of operations, within a specified period of time, etc.

According to just one example, the acceptable probability of failure may be set to $2^{-32}$. It should be understood that this is merely an example to illustrate computation of the random trigger probability, and that in other examples the acceptable probability of failure can be set to any value. Based on this acceptable probability of failure, the collision probability is limited to $2^{-32}$. The probability that k uniformly-distributed n-bit numbers have a collision is:

$$PR[\text{collision with } k \text{ } n\text{-bit nonces}] = 1 - \prod_{i=1}^{k-1} \frac{2^n - i}{2^n} \approx 1 - e^{\frac{-k(k-1)}{2^{n+1}}}$$

The probability that no rotation occurs by the $k^{th}$ trial follows:

$Pr[\text{no rotation in } k \text{ trials}]=(1-t)^k$ where t is the random trigger probability. The probability of a collision using the random rotation is:

$Pr[\text{collision}]=Pr[\text{collision within } k \text{ trials}]+Pr[\text{collision only after more than } k \text{ trials}]\leq Pr[\text{collision with } k \text{ } n\text{-bit nonces}]+Pr[\text{no rotation in } k \text{ trials}]$ Each of the two addends can be limited in an upper bound to $2^{-33}$, so that the upper bound is $2^{-33}+2^{-33}=2^{-32}$. Solving for:

$$2^{-33} = Pr[\text{collision with } k \text{ } n\text{-bit nonces}] \approx 1 - e^{\frac{-k(k-1)}{2^{n+1}}}$$

with n=96, as can be the case for AES-GCM, for example, yields k≈$2^{32}$. Plugging in this k to solve for t:

$2^{-33}=Pr[\text{no rotation in } k \text{ trials}]=(1-t)^k$ $t=1-2^{log2(p)/k}=1-2^{-(33/2^{32})}$ Since t is very small, it can be considered as a power of 2:

$log_2(t)=log_2(1-2^{-(33/2^{32})})=-27.484$

Thus, t should be at least $2^{-27.484}$.

Accordingly, each time a request for a cryptographic operation is received, the system makes a determination with the probability of t whether to rotate keys. For example, the system may perform an event with the probability t in response to each cryptographic request. Such event may be, for example, generating a bit-string, wherein if the bit-string matches one of a predetermined set of bit-strings, it is determined to rotate the key. As another example, such event may be generating a floating point number between 0 and 1, wherein if the number is less than the random trigger probability, it is a signal to rotate the key. While these are merely two examples of possible events, it should be understood that any of a number of other events are possible. The determination of whether to rotate keys may be made automatically in response to receipt of the request to perform a cryptographic operation. For example, receipt of the request may trigger the determination without human intervention. While in some examples the automatic determination of whether to rotate keys may be performed immediately after receipt of the request, in other examples the determination may be performed at a later time.

Figure 3:
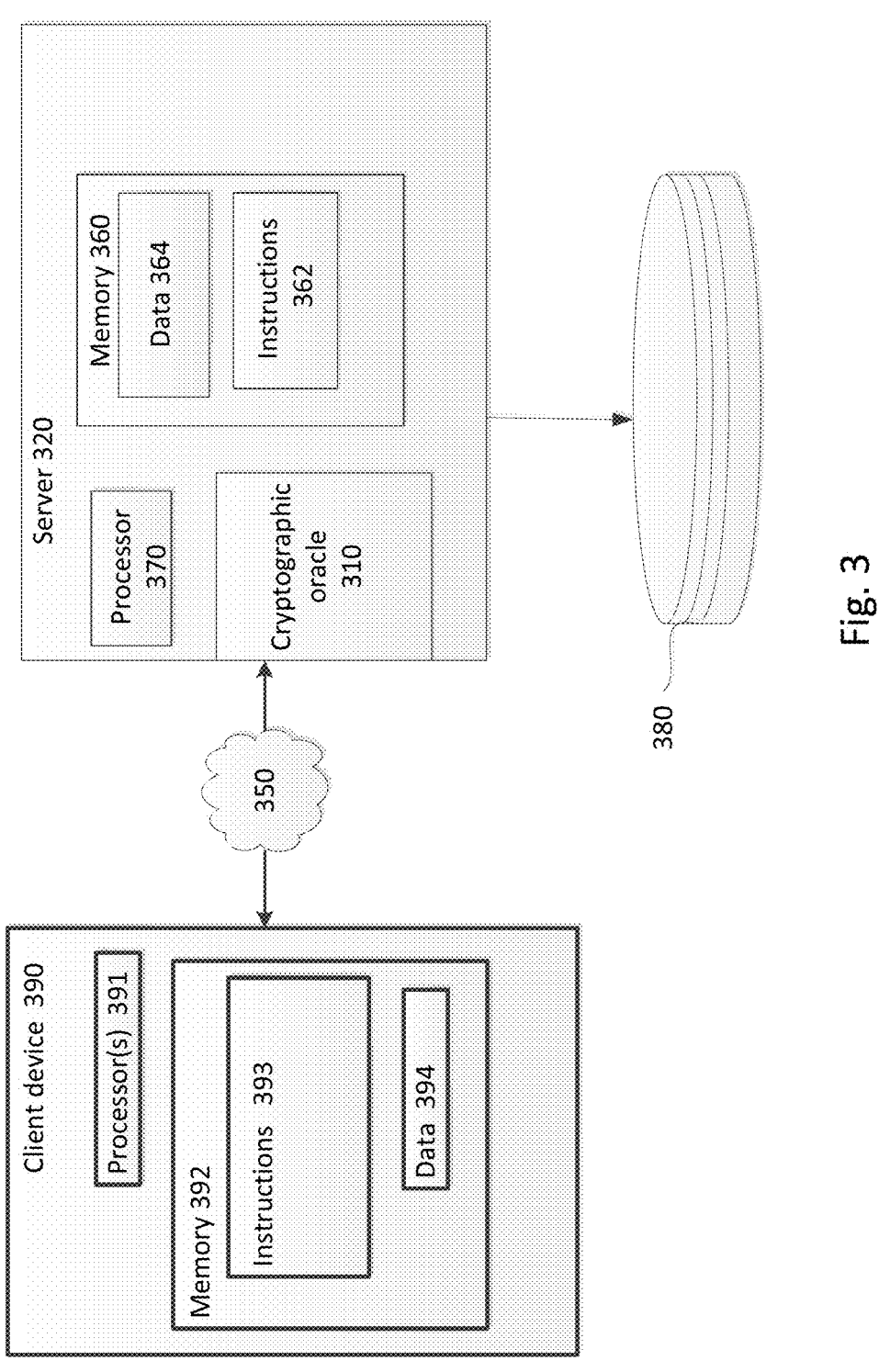
FIG. 3 is a block diagram of an example system according to aspects of the disclosure.

FIG. 3 illustrates an example system for determining whether to rotate cryptographic keys. In particular, the system includes a client device 390 in communication with one or more servers 320 through a network 350, wherein the one or more servers perform cryptographic operations, such as encryption of data supplied by the client 390.

The server 320 may run a service that receives requests, such as from the client 390, to perform cryptographic operations such as to encrypt data. According to some examples, the operation may be performed using the cryptographic oracle 310. While the cryptographic oracle 310 is shown as a component within the server 320, it should be understood that in other examples the cryptographic oracle 310 may be a component in external communication with the server 320. In either example, the cryptographic oracle 310 may be a key management library, a hardware security module (HSM), or other implementation. In further examples, the cryptographic oracle 310 may be a software module executed by the one or more processors 370.

The server 320 includes one or more processors 370. The processors 370 can be any conventional processors, such as commercially available CPUs. Alternatively, the processors can be dedicated components such as an application specific integrated circuit ("ASIC") or other hardware-based processor. Although not necessary, the server 320 may include specialized hardware components to perform specific computing processes.

The memory 360 can store information accessible by the processor 370, including instructions that can be executed by the processor 370 and that can be retrieved, manipulated or stored by the processor 370.

The instructions can be a set of instructions executed directly, such as machine code, or indirectly, such as scripts, by the processor 370. In this regard, the terms "instructions," "steps" and "programs" can be used interchangeably herein. The instructions can be stored in object code format for direct processing by the processor 370, or other types of computer language including scripts or collections of independent source code modules that are interpreted on demand or compiled in advance. Functions, methods, and routines of the instructions are explained in more detail in the foregoing examples and the example methods below.

The data can be retrieved, stored or modified by the processor 370 in accordance with the instructions. The data can also be formatted in a computer-readable format such as, but not limited to, binary values, ASCII or Unicode. Moreover, the data can include information sufficient to identify relevant information, such as numbers, descriptive text, proprietary codes, pointers, references to data stored in other memories, including other network locations, or information that is used by a function to calculate relevant data.

Although FIG. 3 functionally illustrates the processor, memory, and other elements of server 320 as being within the same block, the processor, computer, computing device, or memory can actually comprise multiple processors, computers, computing devices, or memories that may or may not be stored within the same physical housing. For example, the memory can be a hard drive or other storage media located in housings different from that of the server 320. Accordingly, references to a processor, computer, computing device, or memory will be understood to include references to a collection of processors, computers, computing devices, or memories that may or may not operate in parallel. For example, the server 320 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The memory 360 can store information accessible by the processor 370, including instructions 362 that can be executed by the processor 370. Memory can also include data 364 that can be retrieved, manipulated or stored by the processor 370. The memory 360 may be a type of non-transitory computer readable medium capable of storing information accessible by the processor 370, such as a hard-drive, solid state drive, tape drive, optical storage, memory card, ROM, RAM, DVD, CD-ROM, write-capable, and read-only memories. The processor 370 can be a well-known processor or other lesser-known types of processors. Alternatively, the processor 370 can be a dedicated controller such as an ASIC.

The instructions 362 can be a set of instructions executed directly, such as machine code, or indirectly, such as scripts, by the processor 370. In this regard, the terms "instructions," "steps" and "programs" can be used interchangeably herein. The instructions 362 can be stored in object code format for direct processing by the processor 370, or other types of computer language including scripts or collections of independent source code modules that are interpreted on demand or compiled in advance.

The data 364 can be retrieved, stored or modified by the processor 370 in accordance with the instructions 362. For instance, although the system and method is not limited by a particular data structure, the data 364 can be stored in computer registers, in a relational database as a table having a plurality of different fields and records, or XML documents. The data 364 can also be formatted in a computer-readable format such as, but not limited to, binary values, ASCII or Unicode. Moreover, the data 364 can include information sufficient to identify relevant information, such as numbers, descriptive text, proprietary codes, pointers, references to data stored in other memories, including other network locations, or information that is used by a function to calculate relevant data.

The instructions 362 may be executed to determine a random trigger probability, or random rotation probability, indicating when to rotate cryptographic keys. Moreover, instructions may be executed to determine, in response to receipt of a cryptographic operation request, whether to rotate the cryptographic key based on the random trigger probability.

It should be understood that the computing environment described above in connection with FIG. 3 is merely one example, and that other computing environments are also possible. By way of example, the computing environment may include an embedded system. The embedded system may perform cryptography and have a need to decide when to rotate keys. The embedded system may not be able to count the number of cryptographic operations performed. For example, due to limitations on the number of write-cycles that flash memory can support, the flash memory cannot reliably maintain a counter. Accordingly, the embedded system may use a random rotation trigger as described herein.

Figure 4A:
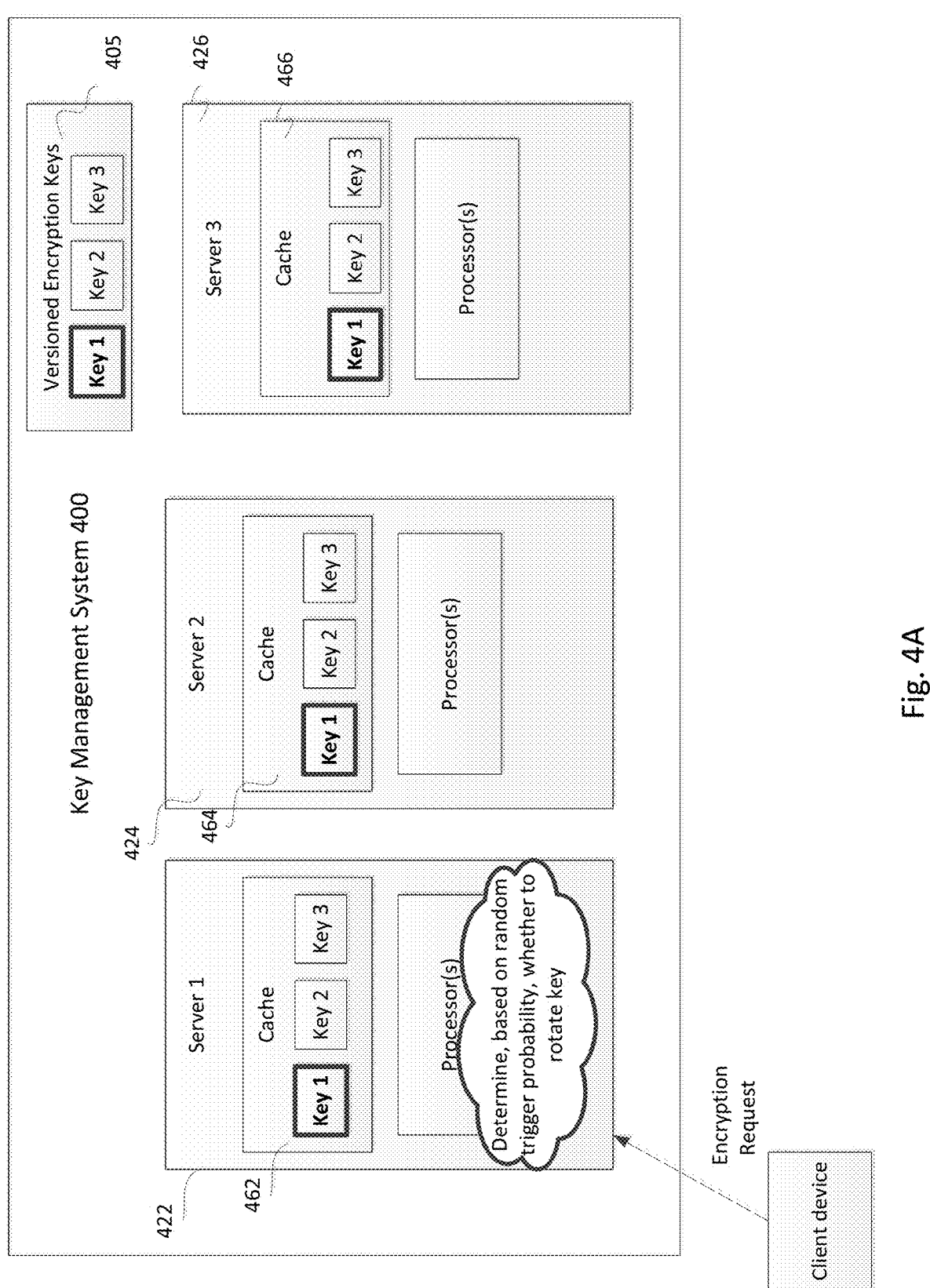
FIGS. 4A-C illustrate an example implementation of a system for determining whether to rotate cryptographic keys according to aspects of the disclosure.
Figure 4B:
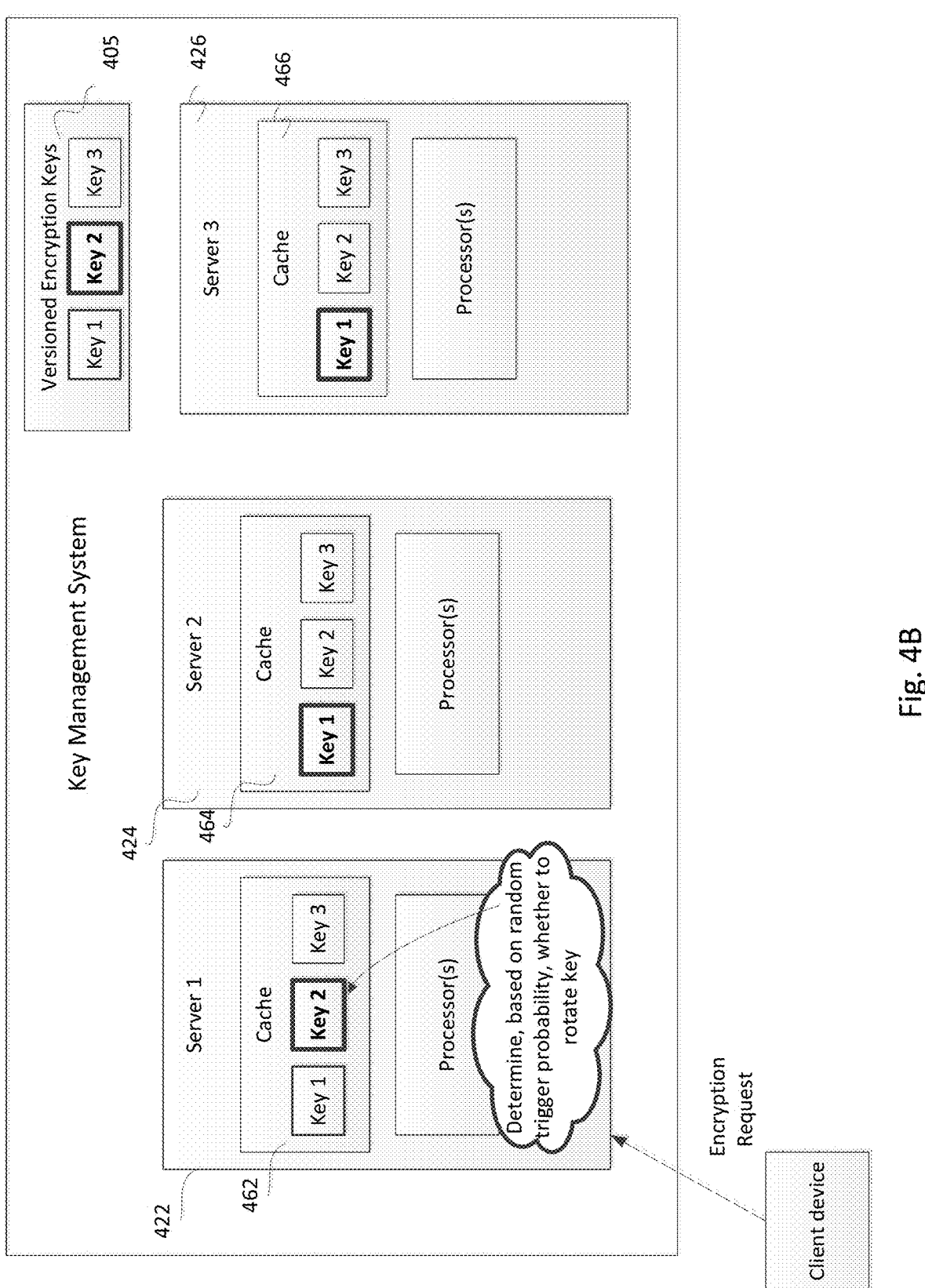
Figure 4C:
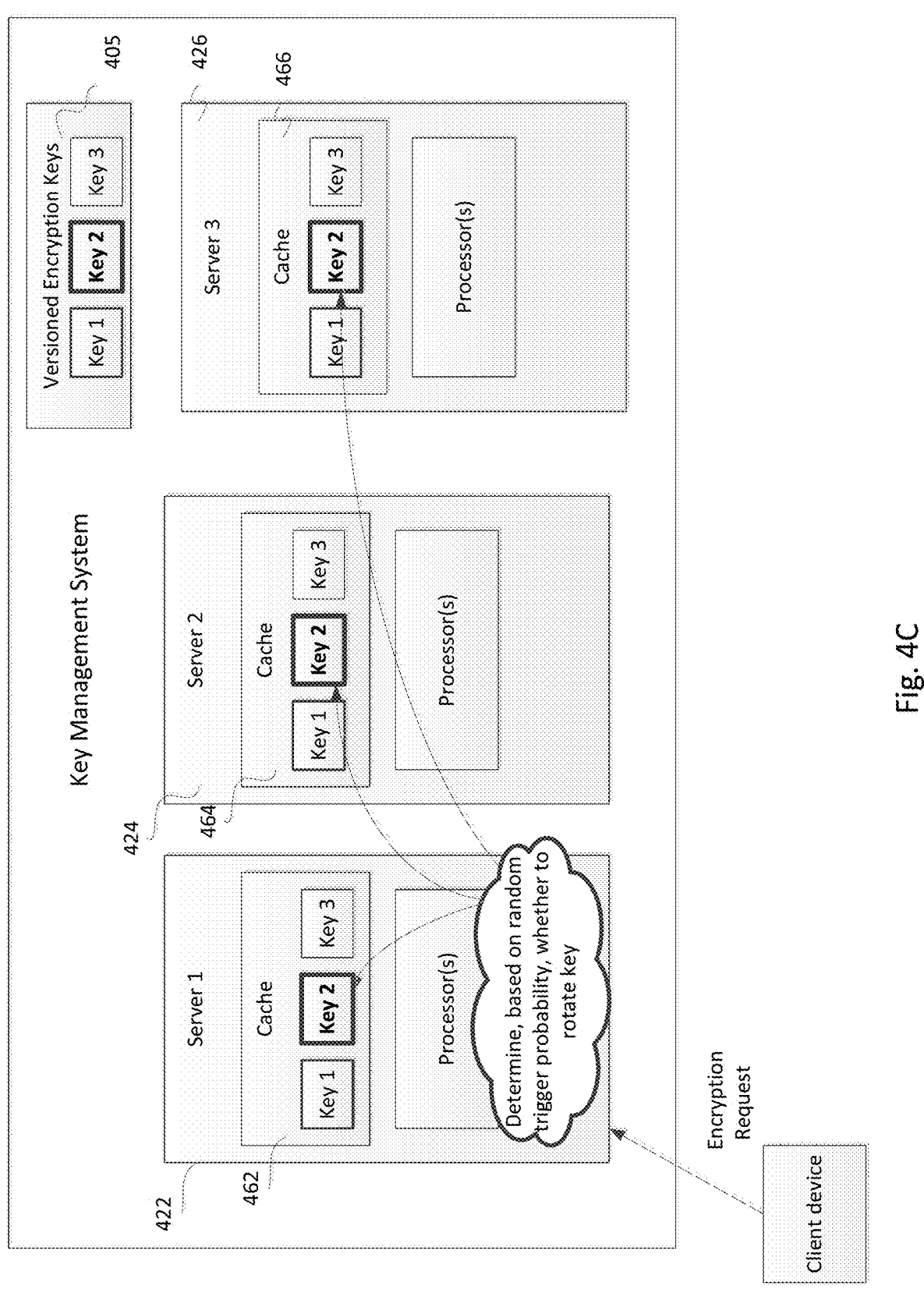

FIGS. 4A-C illustrate one of many possible implementations of the random trigger probability. In this example, a key management system 400 holds a collection of versioned encryption keys 405. Each versioned encryption key, represented as Key 1, Key 2, Key 3 in the figures, may be a collection of key versions. Encrypt operations for a versioned encryption key use the latest, or "primary", key version as the key to generate a ciphertext. Decrypt operations use the same key version that was used to generate the ciphertext. Key rotation includes adding a new key version to a versioned encryption key and designating the new key version as the primary for the versioned encryption key.

To handle a high volume of traffic, the key management system 400 may include multiple servers 422, 424, 426 that can each handle encrypt and decrypt operations using cached copies of the versioned encryption keys 405, with some mechanism to update caches 462, 464, 466 when, or soon after, a new key version is added to a versioned encryption key.

Every time a server, such as the server 422 in FIG. 4A, is called to encrypt using a particular versioned encryption key, the server 422 may determine whether or not to rotate the versioned encryption key as a random event that occurs with the previously determined random trigger probability. For example, in FIG. 4A, the versioned encryption key is Key 1. The server 422 receives the request from the client device, and uses the random trigger probability to determine whether to use Key 1 or whether to use a different versioned encryption key. One of many ways to implement such a random event is to generate a sufficiently precise floating-point random number, x, that is between 0.0 and 1.0, and deciding to rotate the versioned encryption key if x is less than or equal to the random trigger probability.

As shown in FIG. 4B, the outcome of the event dictates that the versioned encryption key should be rotated. Accordingly, the server 422 updates its cache 462 such that Key 2 is the primary key.

As shown in FIG. 4C, servers 424, 426 update their respective caches 464, 466 to make Key 2 the primary key, based on the determination made by the server 422 to rotate keys. According to some examples, the servers 424, 426 may update synchronously or near-synchronously with the server 422. According to other examples, the servers 424, 426 may update asynchronously. For example, the servers 424, 426 may update within a predetermined duration of time after the server 422 updates. According to other examples, the servers 424, 426 may update any time before a subsequent encryption operation is performed by any of the servers 422, 424, 426.

While in the example above, each server 422, 424, 426 is shown as including a respective cache 462, 464, 466 used for storing copies of keys to be used for encryption, in other examples the servers may instead access the key from a separate storage device. Moreover, while the example describes servers, it should be understood that such servers can be other types of computing devices, such as in a distributed computing system.

While in the example above, the cache 462, 464, 466 of each respective server 422, 424, 426 is shown as storing a plurality of cryptographic keys, such that a second key can be selected from the stored keys when rotation is triggered, in other examples the second key need not be pre-stored or pre-generated. For example, the second key can be automatically generated in response to a determination to rotate the cryptographic keys.

Further to the example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 5:
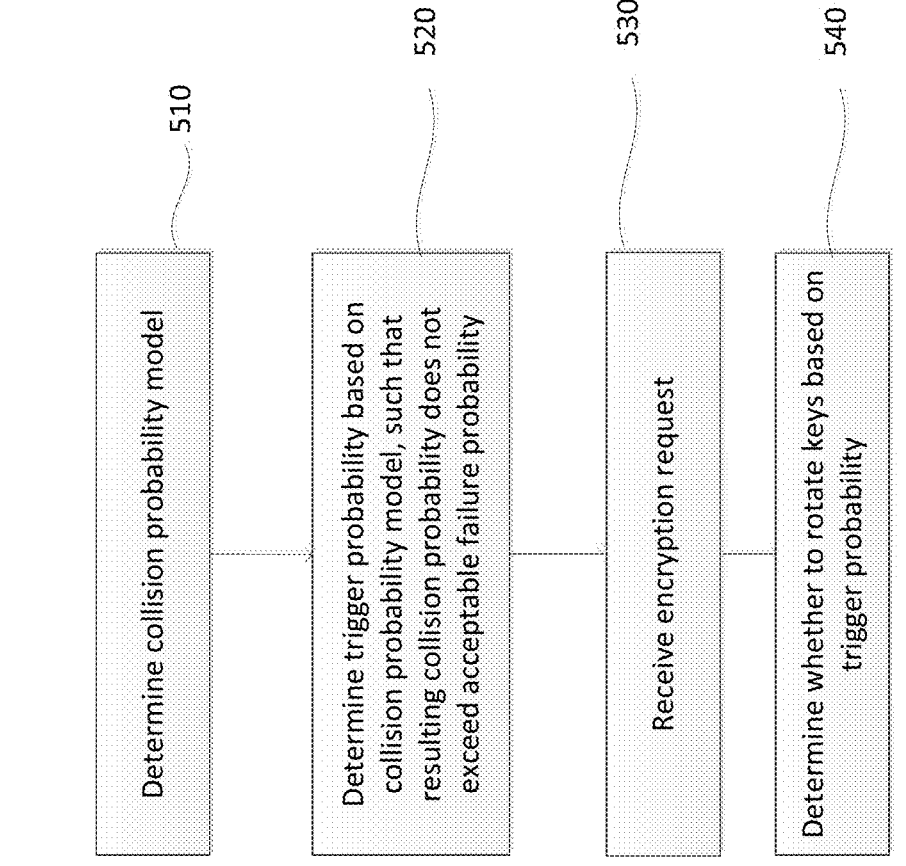
FIG. 5 is a flow diagram illustrating an example method according to aspects of the disclosure.

FIG. 5 illustrates an example method 500 for determining whether to rotate keys used for a cryptographic operation. The method may be performed by, for example, a computing device or module, or a system of one or more distributed server processes.

In block 510, a collision probability model is determined. The collision probability may be a probability that a nonce for the cryptographic operation is used more than once with a same key for the cryptographic operation. The collision probability model relates parameters of the cryptographic operation to the collision probability. As one example, the collision probability model may include the equation described above.

In block 520, a trigger probability is determined. The trigger probability may be determined as a function of the collision probability model and an identified acceptable failure rate. For example, the acceptable failure rate may be selected by a customer or programmer, or dictated by standards. The trigger probability may be computed to keep the collision probability within the acceptable failure rate.

In block 530, a request to perform a cryptographic operation is received. For example, the request may be to perform encryption of data, signing, message authentication, etc.

In block 540, it is determined whether to rotate keys based on the trigger probability. The determination may be made in response to receipt of the cryptographic request. According to some examples, the trigger probability may be pre-computed and stored in a memory accessible by the computing device with a set of instructions. The computing device may execute an event wherein a given outcome of the event occurs with the random trigger probability. The event may be, for example, generating a bit-string, floating point number, etc. When the event is executed and the given outcome occurs, it may be determined to rotate cryptographic keys, such as by replacing one cryptographic key that has been used with a second cryptographic key.

Using the random trigger probability may be beneficial in that the rotation frequency would automatically adapt to how often the key is being used. For example, more frequently used keys would be rotated more frequently, while less frequently used keys would be rotated less frequently. There is no need to count how many times each key has been used. Using the computed random trigger probability ensures that the key would be rotated before reusing a nonce with the same key.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of determining whether to rotate cryptographic keys, comprising:

determining a model of a collision probability that a first key to be used for a cryptographic operation will result in a collision;

determining a random trigger probability based on the model of the collision probability, wherein the random trigger probability limits the collision probability to an accepted failure probability; and automatically determining, with one or more processors in response to receipt of a request to perform a cryptographic operation, based on the random trigger probability, whether to replace the first key with a second key, wherein the request is received at a first computing device in a distributed system comprising a plurality of computing devices, wherein each computing device in the distributed system stores the first key in a respective cache, wherein each computing device updates its respective cache with the second key when the first computing device determines to replace the first key with the second key, wherein determining whether to replace the first key with the second key comprises executing an event where a given outcome occurs with the random trigger probability, and determining to replace the first key with the second key when the given outcome occurs, and wherein one or more of the computing devices updates its respective cache asynchronously with the first computing device.

2. The method of claim 1, wherein the random trigger probability is based on parameters for a type of the cryptographic operation.

3. The method of claim 2, wherein the parameters comprise a number of bits in a nonce.

4. The method of claim 1, wherein the second key is one of a plurality of stored keys, and further comprising replacing the first key with the second key and maintaining the first key as an inactive key.

5. The method of claim 1, wherein the second key comprises a new key generated in response to a determination to replace the first key.

6. The method of claim 1, wherein the event comprises at least one of generating a random bit-string or generating a random floating point number.

7. A system for determining whether to rotate cryptographic keys, comprising:
  a distributed system comprising a plurality of computing devices;
  memory;
  one or more processors in communication with the memory, the one or more processors configured to:
    determine a model of a collision probability that a first key to be used for a cryptographic operation will result in a collision;
    determine a random trigger probability based on the model of the collision probability, wherein the random trigger probability limits the collision probability to an accepted failure probability; and
    automatically determine, in response to receipt of a cryptographic request, based on the random trigger probability, whether to replace the first key with a second key,
    wherein each computing device in the distributed system stores the first key in a respective cache, wherein when the request is received at a first computing device in the distributed system and the first computing device determines to replace the first key with the second key, each computing device updates its respective cache with the second key,
    wherein in determining whether to replace the first key with the second key, the one or more processors are configured to execute an event where a given outcome occurs with the random trigger probability, and determine to replace the first key with the second key when the given outcome occurs, and
    wherein one or more of the computing devices updates its respective cache asynchronously with the first computing device.

8. The system of claim 7, wherein the random trigger probability is based on parameters for a type of the cryptographic operation.

9. The system of claim 8, wherein the parameters comprise a number of bits in a nonce.

10. The system of claim 7, wherein the second key comprises one of a plurality of keys stored in the memory.

11. The system of claim 7, wherein the second key comprises a new key generated in response to a determination to replace the first key.

12. A non-transitory computer-readable medium storing instructions executable by one or more processors for performing method of determining whether to rotate cryptographic keys, the method comprising:

determining a model of a collision probability that a first key to be used for a cryptographic operation will result in a collision;
  determining a random trigger probability based on the model of the collision probability, wherein the random trigger probability limits the collision probability to an accepted failure probability; and
  automatically determining, in response to receipt of a cryptographic request, based on the random trigger probability, whether to replace the first key with a second key,
  wherein the request is received at a first computing device in a distributed system comprising a plurality of computing devices, wherein each computing device in the distributed system stores the first key in a respective cache, wherein each computing device updates its respective cache with the second key when the first computing device determines to replace the first key with the second key,
  wherein determining whether to replace the first key with the second key comprises executing an event where a given outcome occurs with the random trigger probability, and determining to replace the first key with the second key when the given outcome occurs, and
  wherein one or more of the computing devices updates its respective cache asynchronously with the first computing device.

13. The system of claim 7, wherein the event comprises at least one of generating a random bit-string or generating a random floating point number.

14. The non-transitory computer-readable medium of claim 12, wherein the random trigger probability is based on parameters for a type of the cryptographic operation.

15. The non-transitory computer-readable medium of claim 14, wherein the parameters comprise a number of bits in a nonce.

16. The non-transitory computer-readable medium of claim 12, wherein the second key is one of a plurality of stored keys, and further comprising replacing the first key with the second key and maintaining the first key as an inactive key.

17. The non-transitory computer-readable medium of claim 12, wherein the second key comprises a new key generated in response to a determination to replace the first key.

18. The non-transitory computer-readable medium of claim 12, wherein the event comprises at least one of generating a random bit-string or generating a random floating point number.

* * * * *